United States Patent [19]
Morin et al.

[11] 3,857,415
[45] Dec. 31, 1974

[54] REINFORCED CONVOLUTED TUBING OF POLYTETRAFLUOROETHYLENE

[75] Inventors: Louis F. Morin; Edgar L. McNeil, both of Springfield, Mass.

[73] Assignee: Everflex Products, Inc., Ludlow, Mass.

[22] Filed: Apr. 6, 1972

[21] Appl. No.: 241,760

Related U.S. Application Data

[63] Continuation-in-part of Ser. No. 72,441, Sept. 15, 1970, abandoned.

[52] U.S. Cl. .............................. 138/122, 138/125
[51] Int. Cl. ............................................... F16l 9/12
[58] Field of Search ........... 138/121, 122, 124, 125, 138/126, 127

[56] References Cited
UNITED STATES PATENTS

| | | | |
|---|---|---|---|
| 2,125,447 | 8/1938 | Jacobson | 138/122 |
| 2,787,289 | 4/1957 | Press | 138/125 |
| 2,897,840 | 7/1959 | Roberts et al. | 138/122 |
| 2,962,050 | 11/1960 | Ramberg et al. | 138/125 |
| 3,023,787 | 3/1962 | Phillips et al. | 138/125 X |
| 3,139,115 | 6/1964 | Bawcom et al. | 138/121 |
| 3,188,117 | 6/1965 | Press et al. | 138/127 |
| 3,310,447 | 3/1967 | Matthews | 138/125 X |
| 3,460,579 | 8/1969 | Clarkson | 138/125 X |
| 3,481,368 | 12/1969 | Vansickle et al. | 138/125 |
| 3,500,867 | 3/1970 | Elson | 138/125 |
| 3,655,224 | 4/1972 | Carberry | 138/121 |

Primary Examiner—Herbert Goldstein
Attorney, Agent, or Firm—Chapin, Neal and Dempsey

[57] ABSTRACT

Convoluted tubing of polytetrafluoroethylene and the like reinforced by a braid in convoluted form incorporated with the body of polytetrafluoroethylene material as an integral part of the tubing wall structure, particularly for use as an inner core or liner member of an armored, flexible hose assembly.

3 Claims, 4 Drawing Figures

PATENTED DEC 31 1974  3,857,415

REINFORCED CONVOLUTED TUBING OF POLYTETRAFLUOROETHYLENE

The present application is a continuation-in-part of prior application Ser. No. 72,441, filed Sept. 15, 1970 now abandoned, entitled "Corrugated Hose Assembly Formed From Polytetrafluoroethylene Material".

BACKGROUND

This invention relates to flexible tubing of polytetrafluoroethylene or the like (hereinafter PTFE) in convoluted or corrugated form and in particular to a novel reinforced wall structure therefor, and to the method of making the same. Convoluted tubing of PTFE is sometimes used by itself as a flexible conduit with appropriate end fittings. More typically it serves as an inner core or liner of an armored hose assembly having an outer protective sleeve in uniform diameter such as a braided wire sheath also attached at its ends to the liner end fittings.

A main object of this invention is to provide a novel reinforced convoluted tubing wall of PTFE having improved strength and resistance against damage and deterioration from conditions of temperature and pressure as may be encountered in using hose assemblies of various internal diameters such as are now used in industrial and other applications. It is a further and an equally important object to provide a wall structure which is practical and feasible for use as a flexible conduit in assemblies requiring relatively large internal diameters, e.g. greater than 3 inches in diameter and including 10, 12, or 14 inch diameters. In the larger diameter sizes flexible tubing assemblies of composition rubber and of metal construction are as a practical matter almost universally used at the present time, not only because of cost factors, but also by reason of inherent limitations in the performance capabilities of such larger diameter convoluted PTFE tubing as has been available heretofore.

PTFE inner cores of convoluted as well as straight cylindrical wall form are well known in the trade and have long been used in hose assemblies where a quality product is desired. The superior properties of PTFE material for many uses, as compared to metal or composition rubber hose, are widely recognized and need not be elaborated upon in the present specification. PTFE inner cores in convoluted or corrugated form are equally well known to have characteristic limitations as compared to typical hose assemblies provided with PTFE inner cores of a uniform internal diameter. The latter, also commonly encased in an "armor" such as a braided wire sleeve, are generally used in systems which do not require the same degree of flexibility as convoluted tubing, or, in longer lengths in systems where a convoluted inner core assembly would be preferable but is not capable of withstanding the internal heats and pressures involved.

Convoluted inner core tubing as will be recognized provides a higher degree of flexibility which in many instances is highly desirable. The conventional braided wire sleeve armor encloses the inner core to protect it against injury from external forces, to support it between end fittings, and in addition to provide longitudinal strength to the assembly. However, since the surface areas between the ridges of a convoluted inner core are not snugly embraced or directly supported by the conventional cylindrical sleeve or armor (of uniform internal diameter) the sleeve inherently cannot reinforce the wall over all of its surface area so as to prevent mutilation or distortion of the convolutions under conditions beyond the capacity of the PTFE itself. This is in contrast to a typical hose assembly having an inner core wall of uniform diameter where the sleeve imparts added strength directly against radial forces and thus reinforces the PTFE material over the entire wall area. Accordingly, the life of convoluted PTFE hose assemblies has been largely dependent upon and directly related to the overall integrity of its inner core wall structure alone and without regard to the armor.

As will be appreciated from the above and as has been well recognized in the trade a more widespread use of convoluted inner core members of PTFE material in hose assemblies has not occurred principally because of the lack of an effective means to fortify and reinforce the convoluted wall against radial pressures etc. over all the surfaces thereof and thus prevent distortion or collapse. The present invention is designed to incorporate in a convoluted PTFE wall construction, and preferably as an integral part thereof, a reinforcing means to overcome the deficiencies referred to.

SUMMARY OF THE INVENTION

Broadly in its preferred form, the present invention may be practiced by braiding in place to form a contoured outer wall braid layer. The wall comprises strands or plaits of metallic wire, or of suitable strong plastic wire, or glass fibers braided directly over and in a snug embracing contact with the outer convoluted wall surface of a tubular member formed from PTFE materials; applying to the said braided layer a suitable material such as an aqueous dispersion of PTFE, by soaking or immersing it therein; and then heat treating the assembly so formed, as by appropriate PTFE final sintering and curing operation as hereinafter more fully described, to unite the outer layer and PTFE into a unitary wall form for use as an inner core member of a hose assembly.

The wire strands or plaits may be laid down on the convoluted surfaces most expediently in conventional wire braiding machinery used to make cylindrical sleeves of uniform diameter. Such machines are commonly set up for producing tubular sleeves or casings of different uniform diameters by using appropriate change gears. Insofar as is known such machines have not been used to braid wire over a contoured or convoluted tube surface so as to follow and closely embrace the entire surface area of the grooves and ridges. It has been discovered, however, that when a braiding machine is set up for producing a normal straight wall sleeve having a small internal diameter, it is then capable of forming a "contour" braid following the ridges and grooves of convolutions in tubing of a larger diameter size. As will be appreciated by those familiar with the operation of the conventional types of wire braiding machinery, the larger the diameter of the convoluted tubing the closer the angle of the wire strands or plaits, with respect to the axis of the tubing, should approach a transverse relation. Other known variable factors than a tubing diameter are, of course, involved in closely braiding the wire strands or plaits against the convoluted surfaces. The particular shape and depth of the grooves, the gage of wire used as well as the tensioning force applied must all be taken into account among other known variables. The skilled operator without undue experimentation will be able to readily make appropriate adjustments as are suitable for the different variables of a given tubing.

The contoured braiding may be carried out at various stages in the overall formation of the composite PTFE wall. One method which has been successfully used in practice is to initially form a thin shell of PTFE material by winding a single tape of such material on a suitably formed mandrel and then sintering the tape in a short cycle process to produce a convoluted inner mold "shell." Then additional tapes are wound on the so-formed "shell" sufficient for the desired amount of PTFE material in the wall. In the event the tapes cannot be wound with sufficient precision so as to produce the desired outer convoluted surfaces, the grooves and ridges are "finish" formed. Next the wire is braided in place to surround the tape wound wall in a hugging or tensional relationship and immersed in an aqueous dispersion of PTFE. Finally, the assembly is subjected to a full PTFE sintering cycle so as to unify the PTFE material and produce an integral structure having a reinforcing braided layer substantially fully embedded in the outer wall section thereof.

The tubing may also be produced in a single stage PTFE sintering operation. On a suitable collapsible mandrel a plurality of tapes may be wound to provide the desired full thickness of PTFE material, the wire is braided in place and then immersed in a dispersion of PTFE, after which the assembly is subjected to the full PTFE sintering cycle. The two stage sintering process is considered preferable since the pre-formed sintered inner shell of PTFE provides a stronger mandrel "base" on which to wrap not only the additional tapes but particularly to support a close and tightly braided of the wire against the grooved wall surfaces. Additionally, in the final sintering and curing step the inner shell and braided outer reinforcement constitute inner and outer "mold" members for the final forming operation.

Thus, a novel composite inner core structure of convoluted form is produced which has not heretofore been available for use in hose assemblies of smaller internal diameter sizes, and a wall structure which now makes convoluted cores of PTFE practical and available for use in the larger diameter sizes. The flexible core form is not only strengthened against radially exerted forces but gives added strength against longitudinally exerted forces in a hose assembly. With added longitudinal strength the wire for an outer uniformity cylindrical sleeve may be of a lighter gage than that heretofore used for the same size inner core.

The above and other specific objects and advantages will be appreciated from the following description of the invention in connection with the accompanying drawings.

DRAWINGS

DESCRIPTION

Figure 1:
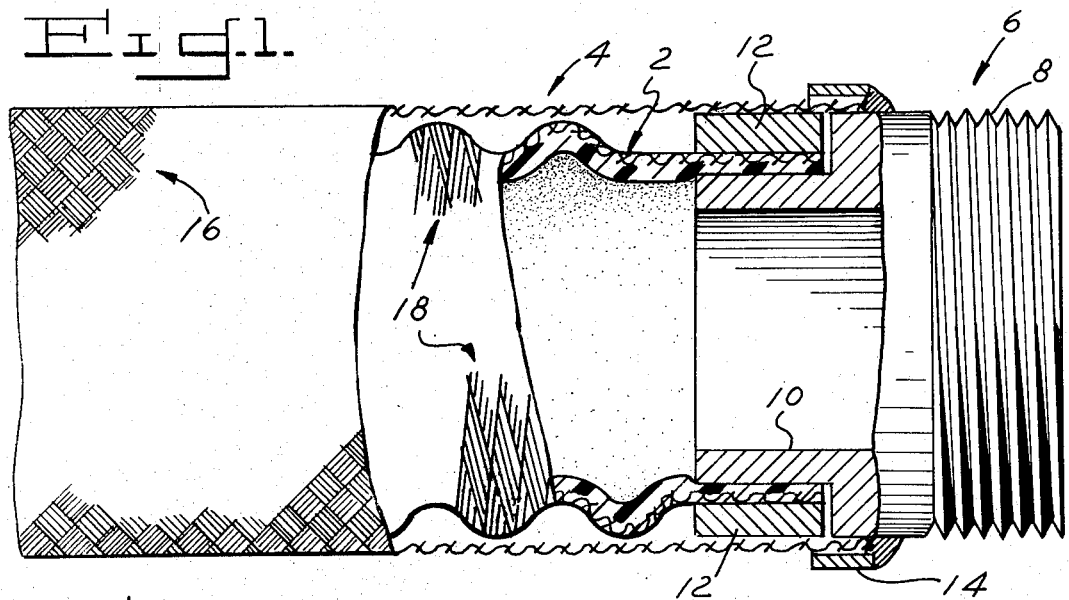
FIG. 1 is a view with parts in section of one end of an armored flexible hose assembly embodying the invention and showing a reinforced PTFE convoluted wall structure of the inner core member and attached end fitting.

In the drawings FIG. 1 shows a flexible hose assembly embodying the invention and comprising a reinforced convoluted inner core member 2, an outer protective sheath or tubular sleeve 4, and a connector coupling or end fitting 6.

The coupling structure by itself is here shown as representative and may be of any suitable construction. As seen in FIG. 1 the coupling body has an outer threaded attachment end at 8, its inner end being provided with a stepped nipple portion 10 inserted in the open end section of the convoluted inner core 2. The latter may be compressed between the nipple portion 10 and a surrounding ring 12 by a swaging or a crimping action or otherwise in order to form a tight seal and prevent leakage under such pressures as are anticipated in use of the assembly. The end of the tubular outer sleeve 4 surrounds the inner end of the coupling and is anchored to it by a collar 14 annularly pocketing the open end edge portion of the sleeve and welding the edge together with the collar around the coupling body.

The other end of the assembly is likewise provided with an appropriate coupling, the specific end connector arrangement not comprising a part of the present invention. The outer protective sleeve 4 is of a uniform diameter and as indicated may comprise a conventional type of braided member as formed by commercial braiding machinery and having a standard braid or weave indicated at 16. The outer sleeve imparts strength to the assembly against longitudinally directed forces under the higher operating pressures for which the tubing is designed, all as is well known. The liner or inner core 2 is a length of convoluted tubing of PTFE material reinforced by a wire braid 18 which is braided in place against the convoluted surface of an inner PTFE wall portion formed as an intermediate step in the manufacture of the tubing as will be later more specifically described. The wire used in braiding may be laid down by adapting standard wire braiding machinery to form a "contour braid." The contour braid adds to the PTFE the strength of the metal throughout the entire length of the wall and thus provides reinforcement to an appreciably greater degree than any previous known methods heretofore proposed for strengthening such tubing and thus overcomes its heretofore accepted deficiencies. The reinforcing contour braid in the PTFE wall is indicated at 18. It will be seen that the strands in the embodiment shown at 18 in FIG. 1, when braided together, form the "contour braid." Each strand may consist of a plurality of individual wire filaments, such as shown, and the wires may be of a metallic or synthetic material including fiber glass.

It may be noted from considering the FIG. 1 assembly that when reinforced throughout its entire length by the contour braid the PTFE wall will be stronger than the material which forms the braid itself (such as stainless steel wire), and far stronger than a wall of PTFE alone or any formulation thereof with added fillers or other expedients previously known. Thus, any pressure and temperature conditions to which an inner core 2 is subjected and which have heretofore characteristically resulted in mutilation or deterioration of an interior wall shape may be efficiently contained by the composite wall as herein disclosed. Specifically, under high flow pressures a "ballooning" action is thus resisted so that the grooving retains its shape and the desired flexible characteristics of the assembly are maintained. When used as a suction line the integrally reinforced wall structure provides increased resistance against inward collapse.

With the reinforcing weave incorporated in the convoluted wall as herein disclosed, resistance against damage under operating conditions is enhanced to the degree that convoluted inner core hose assemblies from the standpoint of performance may be considered as equivalent in most respects to straight wall inner core hose assemblies while maintaining superior flexible characteristics.

Figure 4:
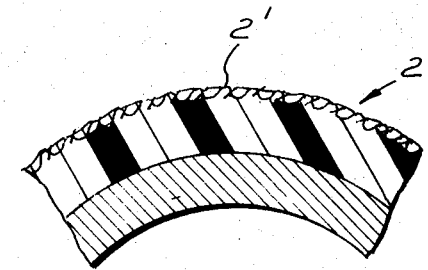
FIG. 4 is a view similar to FIG. 3 diagrammatically illustrating the completed structure of a reinforced inner core wall.

A cross section of the finished wall structure of the preferred form of inner core 2 of FIG. 1 is best seen from FIG. 4 wherein the wire braid reinforcement at 2' is shown as integrally embedded in and thus incorporated with a unitary mass of PTFE wall material, the braid being positioned along the outer section thereof. It will be noted in FIG. 4 that the mesh of the wire braid 2' is diagrammatically shown and appears as a lesser portion of the full wall thickness. However, it will be appreciated that the inner section of PTFE wall material may be of a lesser or greater relative thickness depending upon the quantity of PTFE material desired in any given wall construction.

Figure 2:
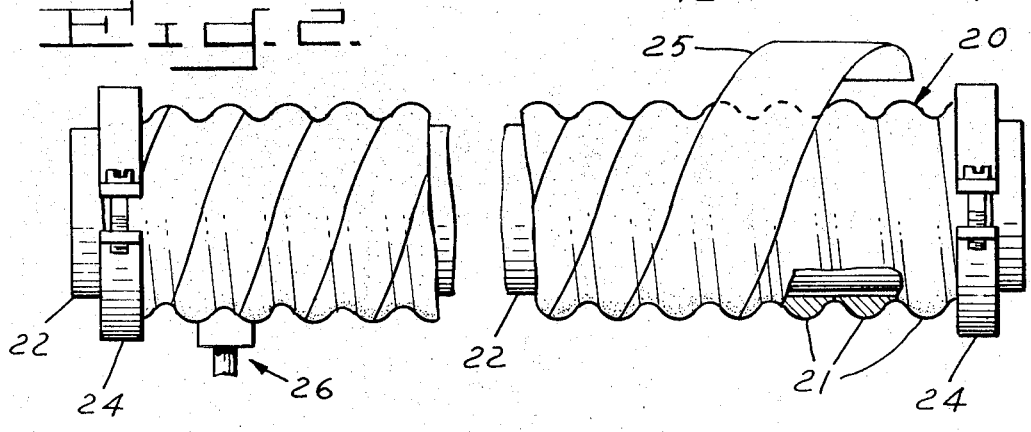
FIG. 2 is a side elevation of a mandrel assembly showing a single PTFE tape being wound thereon prior to a first sintering operation in forming the inner core member of FIG. 1.
Figure 3:
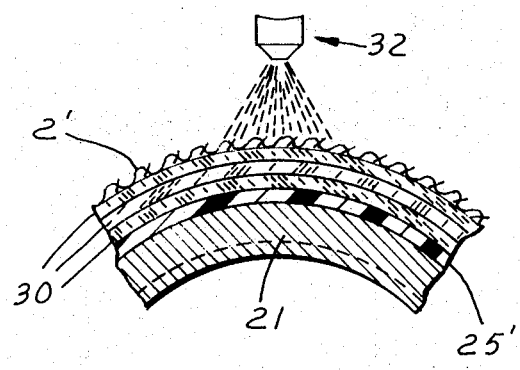
FIG. 3 is a fragmentary sectional view on a greatly enlarged scale illustrating further steps prior to a final sintering of the PTFE material.

With reference to FIGS. 2 and 3, preferred steps in the method of incorporating a convolutely contour braided wire reinforcement in the PTFE of a core wall 2 will be disclosed. In FIG. 2 an aluminum coil mandrel element 20 is shown as wound on a supporting cylindrical shaft 22. The coil windings as indicated at 21 of the mandrel element 20 in an edge to edge abutting relationship and leave no spacing therebetween. The cross sectional shape of the windings form, as shown, a convoluted outer surface and the ends of the coil may be held on the shaft by any suitable clamping means as indicated by end clamps at 24 so as to maintain the desired mandrel surface. On such a mandrel surface a first layering of PTFE may be placed, here indicated as applied by winding a single tape 25 of unsintered PTFE from one end to the other. The single tape may be fed onto the mandrel surface by appropriately turning the shaft 22 and guiding the tape in overlapping fashion to follow the grooved surface. In the event the tape is not then sufficiently in overall surface to surface contact against the mandrel a forming tool, indicated at 26, may be applied to assure such contact.

The coil mandrel as covered with a single tape layering is then placed in a sintering oven at appropriate temperatures for an intial sintering cycle of short duration and approximating 15 minutes. The short cycle has been found sufficient to convert the wound tape into a unitary shell of PTFE. The remainder of the PTFE material may then be built up on this shell and eliminate the otherwise careful handling generally required with unsintered PTFE material. It also serves as a strong base on which the reinforcing wire the braid as shown at 18 in FIG. 1 may be supported for a final sintering and curing operation.

The sintered PTFE shell is indicated in the diagrammatic view of FIG. 3 at 25', the aluminum coil mandrel 20 remaining in place. As indicated in FIG. 3 additional PTFE tapes may then be wound on the shell 25' and in a manner similar to the winding of the initial tape 25 on the mandrel. As many tapes are applied as may be required to build up a desired thickness of the inner section of solid PTFE in the finished wall. Three such tapes are indicated at 30 in FIG. 3. The outer surface of the layered tapes is convolutely formed in the winding process and, if needed, a forming tool may also be used as previously noted. This sub-assembly of mandrel and wound tapes is then mounted in a wire braiding machine. As previously mentioned the braid machine is adjusted to braid the wire strands or plaits at "lead-in" angles approaching a transverse relation to the tubing axis. This relation is apparent from the angle of the intersecting strands or plaits at 18 in FIG. 1. The angular lay of the plaits will, as will be readily understood, vary and adjustments be made so as to be suitable for maintaining contact against a particular conformation of the sides of the grooves defining a given convoluted surface. As will also be fully understood by those familiar with braiding operations the tensioning of the wires, the speed of the machine, etc. may be adjusted to accommodate various specific conditions for depositing as uniform a weave as possible. Such adjustments are well known to the skilled operator of conventional braiding machinery and need not be further described in detail.

An aqueous dispersion of PTFE is applied as indicated in FIG. 3. This may be accomplished by known methods such as spraying, direct immersion, or brushing. Sufficient material is applied to completely immerse the braid in such a PTFE dispersion.

Following immersion of the braid the assembly is then placed in a oven at appropriate curing temperatures for a full sintering and curing cycle. During curing inner shell 25' and outer woven fabric 2' serve in effect as "mold" members enclosing and holding the intermediate tapes therebetween for a full curing cycle which approximates three hours or greater in order to give the PTFE in the end product the desired characteristics for use in pressure hose systems. Thereafter, the PTFE is appropriately quenched and/or cooled, resulting a cured unitary single wall structure having the wire braid bonded therein and embedded as an integral part thereof. The mandrel coil 20 may then be unwound from the tubing interior and the composite wall is ready for attachment of suitable end fittings.

It should be particularly noted that the braiding of the wire in a contoured convoluted jacket form snugly encloses the PTFE tapes between the jacket and the inner "mold" shell and gives support during a full heating cycle for the proper and desired sintering and curing action of the PTFE material. As will be recognized by those familiar with the PTFE art the tapes in the absence of such an effective support along an inner or an outer wall surface will result in localized longitudinal cracking or "splits" in the wall. Accordingly, from a manufacturing process standpoint the braid serves as a novel outer mold member appropriately containing the heated PTFE material so as to enable satisfactory sintering action (i.e. without cracking) and from the standpoint of the finished article the braid which is simply left in place serves to provide a novel reinforcement strengthening the PTFE wall material of the tubing. Thus the braid is not only a "tool" useful in the processing of the article but also constitutes an element which in the finished product increases the quality and fidelity of the same.

The sequence of steps in practicing the invention as disclosed above may be varied. For example, the tubing may be made in a single stage sintering and curing process, omitting the initial sintering cycle of short duration, referred to above. However, a single stage sintering process requires a collapsible mandrel shaft in place of the shaft 22 so as to support the tensioned winding of the wire braid and as is apparent will generally require more care in handling before sintering. In the winding of the additional tapes 30 on the mandrel in either the two-stage or the single stage sintering and curing, one or more of such tapes may be of commerically available "sintered" PTFE material, all as will be appreciated by those familiar with the sintering of PTFE tapes.

While the use of metallic wire for braiding is usually preferred, braiding of strands or plaits of synthetic material such as fiberglass will also impart a substantial and significant degree of added reinforcement to the usual PTFE wall material, and where weight is extremely critical in assemblies designed for particular end uses, fibreglass braid may be preferred. As will be appreciated the contour braid, whether of metal or synthetic wire materials, adds overall strength because of the interlocking of the strands or plaits particularly for transverse dimensional stability in the wall as well as generally resisting internal forces exerted in other directions.

What is claimed is:

1. Reinforced tubing comprising a wall of cured PTFE material and a reinforcing contour braid integral therewith, said wall, including said braid, being of convolute configuration formed by alternate ridges and grooves, said braid being formed of component metal or glass strands disposed at a lead angle relative to the transverse direction of the tubing to follow said convolute configuration including the ridges and grooves thereof and being in generally uniform tension throughout said convoluted wall, said strands being at least partially embedded in said cured PTFE material.

2. Reinforced tubing comprising a wall of cured PTFE material and a reinforcing contour braid integral therewith, said wall, including said braid, being of convolute configuration formed by alternate ridges and grooves, said braid being formed of component strands disposed at a lead angle relative to the transverse direction of the tubing to follow said convolute configuration including the ridges and grooves thereof and being in generally uniform tension throughout said convoluted wall, said strands being at least partially embedded in said cured PTFE material and a cylindrical braided metal sheath coaxially disposed about said convoluted wall and in which the lead angle of the strands forming said sheath with respect to the transverse direction of the tubing is substantially greater than the lead angle of the strands forming the embedded reinforcing braid.

3. Flexible tubing as set forth in claim 2 in which a coupling connector is attached to each end of the tube wall in fluid sealing engagement therewith and in which the outer ends of the braided metal sheath are affixed to said coupling connectors.

* * * * *